(12) United States Patent
Li et al.

(10) Patent No.: US 11,453,370 B2
(45) Date of Patent: Sep. 27, 2022

(54) SENSOR ASSEMBLY WITH A NON-CONTACT SURFACE CLEANING SYSTEM FOR CAMERAS, SENSORS, LIDAR AND THE LIKE

(71) Applicant: GM GLOBAL TECHNOLOGY OPERATIONS LLC, Detroit, MI (US)

(72) Inventors: Zhe Li, Rochester, MI (US); Yuchuan Liu, Troy, MI (US); Bo Yang, Rochester Hills, MI (US); Julien P. Mourou, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 10 days.

(21) Appl. No.: 17/182,666

(22) Filed: Feb. 23, 2021

(65) Prior Publication Data
US 2022/0266802 A1 Aug. 25, 2022

(51) Int. Cl.
*B60S 1/56* (2006.01)
*B60S 1/08* (2006.01)
*G02B 27/00* (2006.01)
*B60R 11/04* (2006.01)

(52) U.S. Cl.
CPC ............. *B60S 1/566* (2013.01); *B60S 1/0848* (2013.01); *B60R 11/04* (2013.01); *G02B 27/0006* (2013.01)

(58) Field of Classification Search
CPC ..... G02B 27/006; G02B 27/0006; B60S 3/00; B60S 1/566; B60S 1/0848; B08B 1/006; B60R 11/04
USPC ...................................................... 15/250.001
See application file for complete search history.

(56) References Cited

U.S. PATENT DOCUMENTS

2006/0171704 A1\* 8/2006 Bingle .................... B60R 11/04
396/419
2014/0192410 A1\* 7/2014 Yoshimura ......... G02B 27/0006
359/509

FOREIGN PATENT DOCUMENTS

WO WO-2015003705 A1 \* 1/2015 ............ B60S 1/0848

\* cited by examiner

*Primary Examiner* — Katina N. Henson
(74) *Attorney, Agent, or Firm* — Vivacqua Crane PLLC

(57) ABSTRACT

A sensor assembly includes a sensor and a cover disposed adjacent to the sensor to protect the sensor. The cover has an inner cover surface and an outer cover surface opposite the inner cover surface. The inner cover surface faces the sensor, and the outer cover surface faces away from the sensor. The cover has a first end wall and a second end wall apart from the first end wall along a first direction. The sensor assembly includes a cleaning system having a wiper movable along the outer cover surface of the cover in the first direction to clean to the outer cover surface. The wiper is at least partly made of a wiper material, and the wiper material includes a hydrophilic material to facilitate removal of water from the outer cover surface of the cover.

18 Claims, 2 Drawing Sheets

SENSOR ASSEMBLY WITH A NON-CONTACT SURFACE CLEANING SYSTEM FOR CAMERAS, SENSORS, LIDAR AND THE LIKE

INTRODUCTION

The present disclosure generally relates sensors and, more particularly, a sensor assembly with a non-contact surface cleaning system for cameras, sensors, lidar, and the like.

Some vehicles include sensors to detect and/or measure different parameters. The sensors may include covers that should be cleaned to keep the sensors working optimally. Specifically, various contaminants (e.g., dust, water, snow) should be removed from the cover of the sensor. The covers of the sensors may also have hydrophilic or hydrophobic coatings that have insufficient wear resistance when cleaned. To address these issues, the presently disclosed sensor assembly includes a cleaning system capable of cleaning the outer surfaces of the cover without contacting the outer surface of the cover.

The present disclosure describes a sensor assembly with a cleaning system. The sensor assembly includes a sensor and a cover disposed adjacent to the sensor to protect the sensor. The cover has an inner cover surface and an outer cover surface opposite the inner cover surface. The inner cover surface faces the sensor, and the outer cover surface faces away from the sensor. The cover has a first end wall and a second end wall apart from the first end wall along a first direction. The cleaning system includes at least one rail and a wiper supported by the at least one rail to guide a linear movement of the wiper along an outer cover surface of a cover. The wiper is movable along the outer cover surface of the cover in the first direction to clean to the outer cover surface. The wiper is at least partly made of a wiper material, and the wiper material includes a hydrophilic material to facilitate removal of water from the outer cover surface of the cover. The wiper and the outer cover surface are spaced apart from each other by a gap to minimize wear of the cover while cleaning the outer cover surface with the wiper.

In an aspect of the present disclosure, the wiper may have a cleaning surface and an outer support surface opposite the cleaning surface. The cleaning surface is spaced apart from the outer support surface along a second direction. The cleaning surface of the wiper faces the outer cover surface of the cover. The gap has a thickness that is between 100 micrometers and 500 micrometers to maximize cleaning while minimizing wear of the outer cover surface. The gap can be also larger than 500 micrometers. The thickness of the gap is measured from the outer cover surface of the cover to the cleaning surface of the wiper along the second direction, and the second direction is perpendicular to the first direction. The system can have multiple wipers. The relative wipers can move either in the same direction relative to the cover outer surface or opposite directions relative to the cover outer surface. The relative motion can be established either by combination of moving of the wipers on stationary cover, or by combination of stationary wipers on moving cover.

In an aspect of the present disclosure, the cover may be made of a transparent material, and the wiper material may be softer than the transparent material to minimize wear of the cover. The cleaning system may further include a cleaner disposed adjacent to the cover to allow the wiper to directly contact the cleaner when the wiper moves in the first direction relative to the outer cover surface of the cover. The wiper is movable along the cleaner to remove water from the wiper when the wiper contacts the cleaner.

In an aspect of the present disclosure, the cleaning system may further include a first cleaner and a second cleaner. The first cleaner is disposed adjacent to the first end wall of the cover to allow the wiper to directly contact the first cleaner when the wiper moves relative to the outer cover surface of the cover. The second cleaner is disposed adjacent to the second end wall of the cover to allow the wiper to directly contact the second cleaner when the wiper moves relative to the outer cover surface of the cover. The second cleaner is spaced apart from the first cleaner along the first direction. Each of the first cleaner and the second cleaner is configured to remove water from the wiper when the wiper directly contacts a respective one of the first cleaner and the second cleaner.

In an aspect of the present disclosure, the wiper (s) is/are movable back and forth relative to the outer cover surface of the cover between the first cleaner and the second cleaner. The first cleaner is spaced apart from the first end wall in the first direction by a first void to allow the water removed from the outer cover surface by the wiper to flow away from the outer cover surface. The second end wall is spaced apart from the second cleaner in the first direction by a second void to allow the water removed from the outer cover surface by the wiper to flow away from the outer cover surface.

In an aspect of the present disclosure, the cover may include a coating. The coating is disposed on the outer cover surface. The coating may be made of a hydrophobic material to facilitate removal of water from the outer cover surface when the wiper moves along the outer cover surface.

In an aspect of the present disclosure, the cover includes a coating. The coating is disposed on the outer cover surface. The coating may be made of the hydrophilic material to aid the wiper in collecting water on the outer cover surface.

In an aspect of the present disclosure, the cleaning system may further include a heater in thermal communication with the wiper. The heater is configured to apply thermal energy to the wiper to aid in removing snow from the outer cover surface. The wiper may include a wiper edge shaped as a wedge to facilitate removal of debris from the outer cover surface.

The present disclosure also describes a vehicle system with sensor assembly described above. The vehicle system may include a vehicle body and a plurality of wheels. One or more of the sensor assemblies described may be coupled to the vehicle body.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
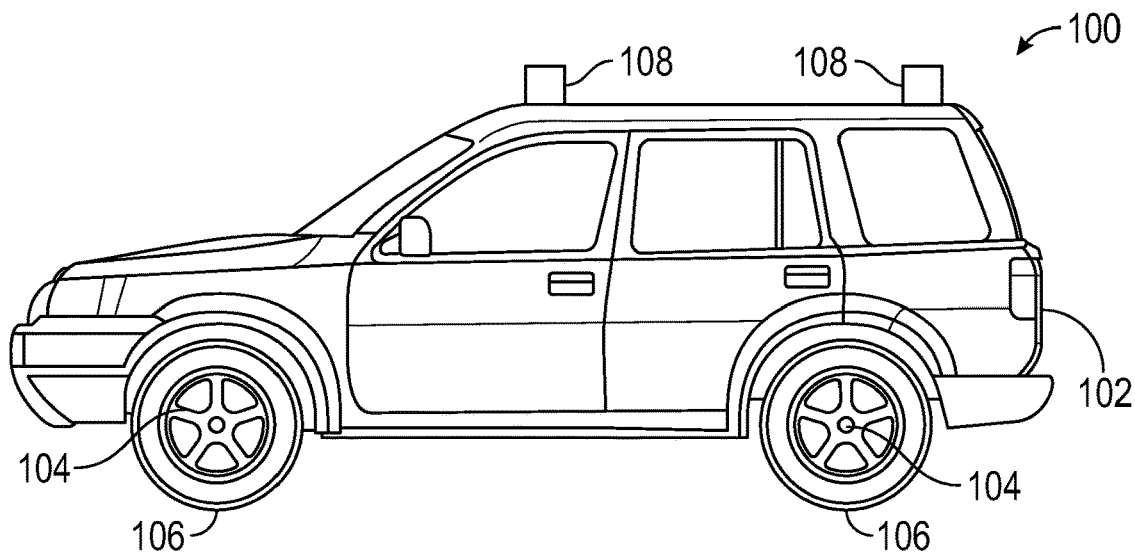
FIG. 1 is a schematic diagram of a vehicle including sensor assemblies.

With reference to FIG. 1, a vehicle system 100 includes a vehicle body 102 and a plurality of wheels 104. In addition to the wheels 104, the vehicle system 100 may include plurality of tires 106 each coupled to one of the wheels 104. The vehicle system 100 further includes one or more sensor assemblies 108 coupled to the vehicle body 102. The sensor assembly 108 is configured to detect and/or measure conditions around the vehicle system 100.

With reference to FIGS. 2, 2A, 2B, and 3, the sensor assembly 108 includes a sensor 110 for detecting and/or measuring conditions around the vehicle system 100. The term "sensor" means a device that responds to a physical stimulus (such as heat, light, sound, pressure, magnetism, or a particular motion) and transmits a resulting impulse (as for measurement or operating a control). As non-limiting examples, the sensor 110 may be or include a lidar, radar, camera, or the like. The sensor assembly 108 further includes a cover 112 disposed adjacent to the sensor 110 to protect the sensor 110. The cover 112 may be wholly or partly made of a transparent material to facilitate the transmission of a light or another electromagnetic wave from the sensor 110 to the outside environment.

The cover 112 may be coupled by one or more supports 114. The supports 114 may be configured, for example as beams, and are each configured to maintain the cover 112 in a fixed position relative to the sensor 110. Specifically, the supports 114 are directly coupled to the cover 112 to maintain the cover 112 at a location adjacent to the sensor 110.

The cover 112 has an inner cover surface 116 and an outer cover surface 118 opposite the inner cover surface 116. The inner cover surface 116 faces the sensor 110, and the outer cover surface 118 faces away from the sensor 110. Moreover, the cover 112 has a first end wall 120 and a second end wall 122 opposite the first end wall 120. The second end wall 122 is spaced apart from the first end wall 120 along a first direction FD. The first end wall 120 directly connects the inner cover surface 116 to the outer cover surface 118. The second end wall 122 directly connects the inner cover surface 116 to the outer cover surface 118. The inner cover surface 116 is spaced apart from the outer cover surface 118 along a second direction SD. The second direction SD is perpendicular to the first direction FD. The cover 112 may therefore be elongated along the first direction FD to fully protect the sensor 110 from other objects.

The sensor assembly 108 includes a cleaning system 124 for cleaning the cover 112. As non-limiting examples, the cleaning system 124 is configured to clean the outer cover surface 118 of the cover 112 from debris, water, snow, insects, dirt, dust, and other contaminants, thereby increasing the accuracy of the sensor 110. The cleaning system 124 includes a wiper 126 movable relative to cover 112 along the first direction FD. Specifically, the wiper 126 is movable along the outer cover surface 118 of the cover 112 in the direction indicated by double arrows DA to clean the outer cover surface 118. The double arrows DA are parallel to the first direction FD. The wiper 126 is partly or wholly made of a wiper material. This wiper material includes a hydrophilic material to facilitate removal of water from the outer cover surface 118 of the cover 112 when the wiper 126 moves along the outer cover surface 118. The profile shape of the wiper 126 may be flat, round, curved or other shapes. The cover 112 may have a cylindrical curved shape. The thickness of the wiper 126 may be different based on weather requirements. The wiper 126 may be transparent or non-transparent depending on particular needs.

The cleaning system 124 may include one or more rails 128 for supporting the wiper 126. The rails 128 therefore support the wiper 126 and guide the linear movement of the wiper 126 along the outer cover surface 118 of the cover 112 in the direction indicated by double arrows DA. The relative motion can be established either by combination of moving of the wipers 126 on a stationary cover 112, or by combination of stationary wipers 126 on a moving cover 112.

The cleaning system 124 further includes an actuator 130 capable of moving the wiper 126 relative to the cover 112 in the direction indicated by double arrows DA. As a non-limiting example, the actuator 130 may be or include an electric motor or another device suitable to move the wiper 126 relative to the cover 112 in the direction indicated by double arrows DA.

The cleaning system 124 may further include a heater in thermal communication with the wiper 126. As a non-limiting example, the beater 132 may be an electric heater. The heater 132 is configured to apply thermal energy to the wiper 126 to aid in the removal of snow or other solids from the outer cover surface 118 of the cover 112 when the wiper 126 moves along the outer cover surface 118 in the direction indicated by double arrows DA. As a non-limiting example, the heater 132 may be operated in an on/off basis.

Figure 2:
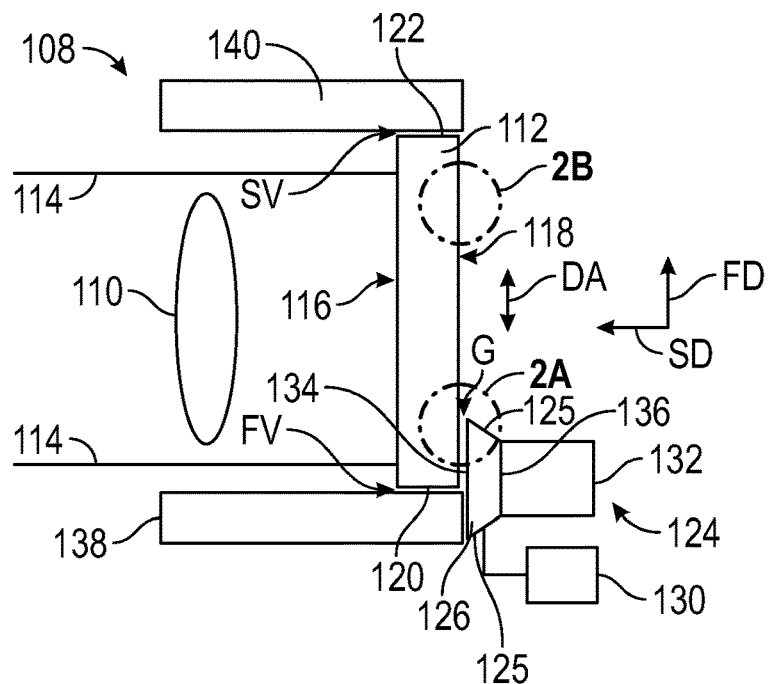
FIG. 2 is a schematic side view of one of the sensor assemblies of FIG. 1, wherein the sensor assembly includes a cleaning system.
Figure 2A:
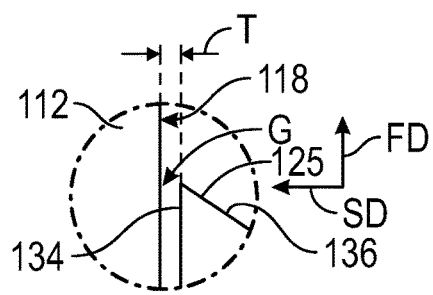
FIG. 2A is a schematic, side enlarged view of the sensor assembly of FIG. 1, taken around area A of FIG. 2.

With reference to FIGS. 2 and 2A, the wiper 126 and the outer cover surface 118 of the cover 112 are spaced apart from each other by a gap G to minimize wear of the cover 112 while cleaning the outer cover surface 118 with the wiper 126. The wiper 126 has a cleaning surface 134 and an outer support surface 136 opposite the cleaning surface 134. The cleaning surface 134 is configured to clean the cover 112 and is spaced apart from the outer support surface 136 along the second direction SD. The cleaning surface 134 of the wiper 126 faces the outer cover surface 118 of the cover 112. The outer support surface 136 of the wiper 126 faces away from the outer cover surface 118 of the cover 112 and is configured to support, for example, the heater 132. The gap G has a thickness T that is between 100 micrometers and 500 micrometers to maximize cleaning while minimizing wear of the outer cover surface 118. The gap G may be greater than 500 micrometers. The thickness T of the gap G is measured from the outer cover surface 118 of the cover 112 to the cleaning surface 134 of the wiper along the second direction SD. As mentioned above, the second direction SD is perpendicular to the first direction FD, and the first direction FD is parallel to the double arrows DA. The surface roughness of the cleaning surface 134 may be optimized to a higher value to enhance the water removal effect. The wiper 126 may include one or more wiper edges 125 shaped as a wedge to facilitate removal of debris from the outer cover surface.

With reference again to FIGS. 2, 2A, 2B, and 3, the wiper 126 is partly or wholly made of a wiper material, and this wiper material is softer than the transparent material forming the cover 112 to minimize wear of the cover 112. Friction and wear reduction coatings may also be applied on the wiper(s) 12 to further minimize wear on the cover. The wiper material may be a metallic material, which is hydrophilic.

In the depicted embodiment, the cleaning system 124 includes a first cleaner 138 and a second cleaner 140. The term "cleaner" means an apparatus or machine for cleaning, such as a brush. As a non-limiting example, the first cleaner 138 and/or the second cleaner 140 may be or include a brush, a wipe, or another apparatus made of an absorbent material. The first cleaner 138 is disposed adjacent to the first end wall 120 of the cover 112 to allow the wiper 126 to directly contact the first cleaner 138 when the wiper 126 moves relative to the outer cover surface 118 of the cover 112. The second cleaner 140 is disposed adjacent to the second end wall 122 of the cover 112 to allow the wiper 126 to directly contact the second cleaner 140 when the wiper 126 moves relative to the outer cover surface 118 of the cover 112. The second cleaner 140 is spaced apart from the first cleaner 138 along the first direction FD. Each of the first cleaner 138 and the second cleaner 140 is configured to remove water from the wiper 126 when the wiper 126 comes in contact with the respective one of the first cleaner 138 and the second cleaner 140. While the depicted embodiment shows the first cleaner and the second cleaner, it is contemplated that the cleaning system 124 may include more or fewer cleaners.

The wiper(s) 126 is/are movable back and forth relative to the outer cover surface 118 of the cover 112 between (and inclusive of) the first cleaner 138 and the second cleaner 140. The speed of the wiper 126 may be optimized depending on the particular needs. For example, the speed of the wiper 126 may be 1 meter per second to quickly and efficiently remove water or debris from the outer cover surface 118 of the cover 112. In another example, the speed of the wiper 126 may be 0.5 meters per second to maximize the amount of water or debris removed from the outer cover surface 118 of the cover 112. The first cleaner 138 is spaced apart from the first end wall 120 in the first direction FD by a first void FV to allow the water (or another liquid) removed from the outer cover surface 118 by the wiper 126 to flow away from the outer cover surface 118. The second end wall 122 is spaced apart from the second cleaner 140 in the first direction FD by a second void SV to allow the water removed from the outer cover surface 118 by the wiper 126 to flow away from the outer cover surface 118.

Figure 2B:
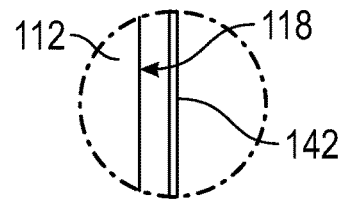
FIG. 2B is a schematic, side enlarged view of the sensor assembly of FIG. 1, taken around area B of FIG. 2.
Figure 3:
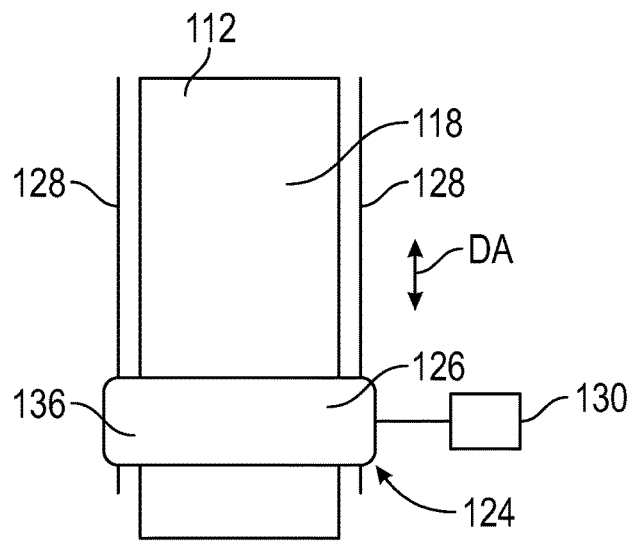
FIG. 3 is a schematic front view of the sensor assembly of FIG. 2, depicting the cleaning system.

With reference to FIGS. 2 and 2B, the cover 112 includes a coating 142. The coating 142 is disposed on the outer cover surface 118. The coating 142 may be wholly or partly made of a hydrophobic material to facilitate removal of water from the outer cover surface 118 when the wiper 126 moves along the outer cover surface 118. Alternatively, the coating 142 is partly or wholly made of a hydrophilic material to aid the wiper 126 in collecting water on the outer cover surface 118.

Figure 4:
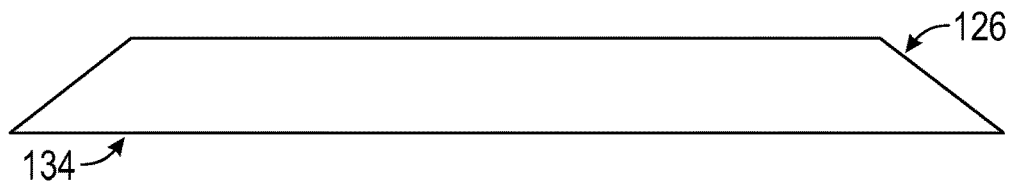
FIG. 4 is a schematic top view of a wiper of the cleaning system shown in FIG. 2, wherein the wiper has a flat cleaning surface.
Figure 5:
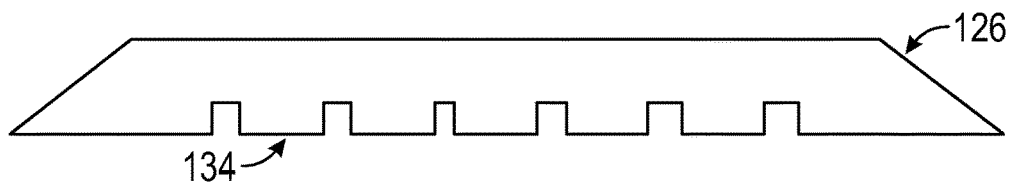
FIG. 5 is a schematic top view of a wiper of the cleaning system shown in FIG. 2, wherein the wiper has a cleaning surface with a square wave shape.
Figure 6:
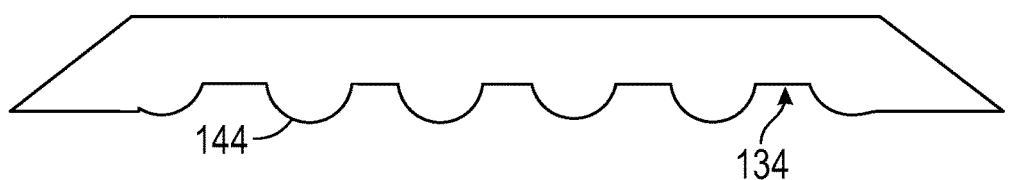
FIG. 6 a schematic top view of a wiper of the cleaning system shown in FIG. 2, wherein the wiper has a cleaning surface with rounded protrusions.
Figure 7:
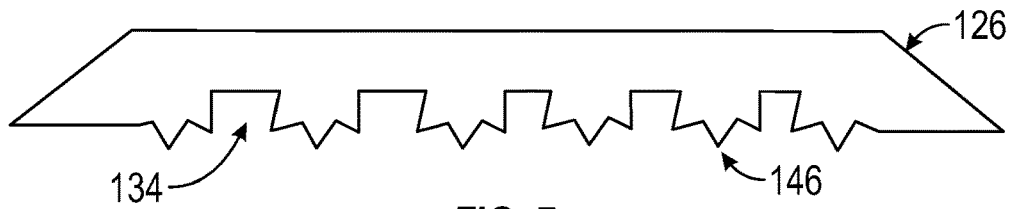
FIG. 7 is a schematic top view of a wiper of the cleaning system of FIG. 2, wherein the wiper has a cleaning surface with sharp protrusions.

The surface texture of the cleaning surface 134 of the wiper 126 may vary depending on the particular needs or environment. For example, as shown in FIG. 4, the cleaning surface 134 of the wiper 126 may be flat and planar to facilitate manufacturing of the wiper 126. In another example, as shown in FIG. 5, the cleaning surface 134 of the wiper 126 has a one-level structure having a square wave shape to enhance the water removal effect. In yet another example, as shown in FIG. 6, the cleaning surface 134 of the wiper 126 has a one-level structure with rounded protrusions 144 to enhance the water removal effect. In another example, as shown in FIG. 7, the cleaning surface 134 of the wiper 126 has a double-level structure with sharp protrusions 146 to enhance the water removal effect.

As used herein, a system, apparatus, structure, article, element, component, or hardware "configured to" perform a specified function is indeed capable of performing the specified function without alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Any feature of any embodiment may be used in combination with or substituted for any other feature or element in any other embodiment unless specifically restricted. Accordingly, the disclosure and the figures are to be regarded as illustrative rather than restrictive.

What is claimed is:

1. A sensor assembly, comprising:
   a sensor;
   a cover disposed adjacent to the sensor to protect the sensor, wherein the cover has an inner cover surface and an outer cover surface opposite the inner cover surface, the inner cover surface faces the sensor, and the outer cover surface faces away from the sensor, the cover has a first end wall and a second end wall apart from the first end wall along a first direction;
   a wiper movable along the outer cover surface of the cover in the first direction to clean the outer cover surface;
   wherein the wiper is at least partly made of a wiper material, and the wiper material includes a hydrophilic material to facilitate removal of water from the outer cover surface of the cover;
   wherein the wiper and the outer cover surface are spaced apart from each other by a gap to minimize wear of the cover while cleaning the outer cover surface with the wiper; and
   wherein the sensor assembly further includes a cleaner disposed adjacent to the cover to allow the wiper to directly contact the cleaner when the wiper moves linearly in the first direction relative to the outer cover surface of the cover, and the wiper is linearly movable toward and away from the cleaner in the first direction to remove water from the wiper when the wiper directly contacts the cleaner.

2. The sensor assembly of claim 1, wherein the wiper has a cleaning surface and an outer support surface opposite the cleaning surface, the cleaning surface is spaced apart from the outer support surface along a second direction, the cleaning surface of the wiper faces the outer cover surface of the cover, the gap has a thickness that is between 100 micrometers and 500 micrometers to maximize cleaning while minimizing wear of the outer cover surface, the thickness of the gap is measured from the outer cover surface of the cover to the cleaning surface of the wiper along the second direction, and the second direction is perpendicular to the first direction.

3. The sensor assembly of claim 1, wherein the cover is made of a transparent material, and the wiper material is softer than the transparent material to minimize wear of the cover.

4. The sensor assembly of claim 1, wherein the cleaner is a first cleaner, and the sensor assembly further includes a second cleaner, wherein the first cleaner is disposed adjacent to the first end wall of the cover to allow the wiper to directly contact the first cleaner when the wiper moves relative to the outer cover surface of the cover, the second cleaner is disposed adjacent to the second end wall of the cover to allow the wiper to directly contact the second cleaner when the wiper moves relative to the outer cover surface of the cover, the wiper is linearly movable toward and away from the second cleaner in the first direction, the second cleaner is spaced apart from the first cleaner along the first direction, and each of the first cleaner and the second cleaner is configured to remove water from the wiper when the wiper directly contacts a respective one of the first cleaner and the second cleaner, and the first cleaner is a brush, the wiper is linearly movable relative to the cover in the first direction at 0.5 meters per second, the wiper includes a wiper body and a plurality of rounded protrusions extending from the wiper body.

5. The sensor assembly of claim 4, wherein the wiper is linearly movable back and forth between, and inclusive of, the first cleaner and the second cleaner, the first cleaner is spaced apart from the first end wall in the first direction by a first void to allow the water removed from the outer cover surface by the wiper to flow away from the outer cover surface, the second end wall is spaced apart from the second cleaner in the first direction by a second void to allow the water removed from the outer cover surface by the wiper to flow away from the outer cover surface.

6. The sensor assembly of claim 1, wherein the cover includes a coating, the coating is disposed on the outer cover surface, and the coating is made of a hydrophobic material to facilitate removal of water from the outer cover surface when the wiper moves along the outer cover surface.

7. The sensor assembly of claim 1, wherein the cover includes a coating, the coating is disposed on the outer cover surface, and the coating is made of the hydrophilic material to aid the wiper in collecting water on the outer cover surface.

8. The sensor assembly of claim 1, further comprising a heater in thermal communication with the wiper, wherein the heater is configured to apply thermal energy to the wiper to aid in removing snow from the outer cover surface.

9. The sensor assembly of claim 1, wherein the wiper includes a wiper edge shaped as a wedge to facilitate removal of debris from the outer cover surface.

10. A cleaning system for a sensor, comprising:
    at least one rail;
    a wiper supported by the at least one rail to guide a linear movement of the wiper along an outer cover surface of a cover, wherein the wiper is configured to move in a first direction to clean to outer cover surface;
    wherein the wiper is at least partly made of a wiper material, and the wiper material includes a hydrophilic material to facilitate removal of water from the outer cover surface of the cover;
    wherein the wiper and the outer cover surface are spaced apart from each other by a gap to minimize wear of the cover while cleaning the outer cover surface with the wiper; and
    wherein the cleaning system further includes a cleaner disposed adjacent to the cover to allow the wiper to directly contact the cleaner when the wiper moves linearly in the first direction relative to the outer cover surface of the cover, and the wiper is linearly movable toward and away from the cleaner in the first direction to remove water from the wiper when the wiper directly contacts the cleaner.

11. The cleaning system of claim 10, wherein the wiper has a cleaning surface and an outer support surface opposite the cleaning surface, the cleaning surface is spaced apart from the outer support surface along a second direction, the cleaning surface of the wiper faces the outer cover surface of the cover, the gap has a thickness that is between 100 micrometers and 500 micrometers to maximize cleaning while minimizing wear of the outer cover surface, the thickness of the gap is measured from the outer cover surface of the cover to the cleaning surface of the wiper along the second direction, and the second direction is perpendicular to the first direction.

12. The cleaning system of claim 10, wherein the cover is made of a transparent material, and the wiper material is softer than the transparent material to minimize wear of the cover, the at least one rail is a first rail directly connected to the wiper, the cleaning system further includes a second rail directly connected to the wiper, the first rail is elongated along the first direction, the second rail is elongated along the first direction, the first rail is parallel to the second rail, the cleaning system further includes a first support directly connected to the cover, the cleaning system further includes a second support directly connected to the cover, each of the first support and the second support is a beam elongated along the second direction and configured to maintain the cover in a fixed position relative to the sensor, and the wiper is linearly movable relative to the cover at 1 meter per second, and the first support is spaced apart from the second support along the first direction.

13. The cleaning system of claim 10, wherein the cleaner is a first cleaner, and the cleaning system further includes a second cleaner, the cover includes a first end wall and a second end wall opposite the first end wall, the first end wall is spaced apart from the first end wall along the first direction, the first cleaner is disposed adjacent to the first end wall of the cover to allow the wiper to directly contact the first cleaner when the wiper moves relative to the outer cover surface of the cover, the second cleaner is disposed adjacent to the second end wall of the cover to allow the wiper to directly contact the second cleaner when the wiper moves relative to the outer cover surface of the cover, the wiper is linearly movable toward and away from the second cleaner in the first direction, the second cleaner is spaced apart from the first cleaner along the first direction, each of the first cleaner and the second cleaner is configured to remove water from the wiper when the wiper comes in contact with the respective one of the first cleaner and the second cleaner, each of the first cleaner and the second cleaner remain stationary relative to the cover while the wipe moves linearly between the first cleaner and the second cleaner in the first direction, and each for the first cleaner and the second cleaner is a brush.

14. The cleaning system of claim 13, wherein the wiper is movable back and forth relative to the outer cover surface of the cover between the first cleaner and the second cleaner, the first cleaner is spaced apart from the first end wall in the first direction by a first void to allow the water removed from the outer cover surface by the wiper to flow away from the outer cover surface, the second end wall is spaced apart from the second cleaner in the first direction by a second void to allow the water removed from the outer cover surface by the wiper to flow away from the outer cover surface.

15. The cleaning system of claim 10, wherein the cover includes a coating, the coating is disposed on the outer cover surface, and the coating is made of a hydrophobic material to facilitate removal of water from the outer cover surface when the wiper moves along the outer cover surface.

16. The cleaning system of claim 10, wherein the cover includes a coating, the coating is disposed on the outer cover surface, and the coating is made of the hydrophilic material to aid the wiper in collecting water on the outer cover surface.

17. The cleaning system of claim 10, further comprising a heater in thermal communication with the wiper, wherein the heater is configured to apply thermal energy to the wiper to aid in removing snow from the outer cover surface.

18. A vehicle system, comprising:
a vehicle body including a roof;
a sensor assembly directly connected to the roof of the vehicle body, wherein the sensor assembly comprises:
  a sensor;
  a cover disposed adjacent to the sensor to protect the sensor, wherein the cover has an inner cover surface and an outer cover surface opposite the inner cover surface, the inner cover surface faces the sensor, and the outer cover surface faces away from the sensor, the cover has a first end wall and a second end wall apart from the first end wall along a first direction;
  a first rail and a second rail;
  a wiper supported by the first rail and the second rail to guide a linear relative movement of the wiper along the outer cover surface of the cover, wherein the wiper is configured to move in the first direction to clean to outer cover surface of the cover in the first direction to clean to the outer cover surface;
wherein the wiper is at least partly made of a wiper material, and the wiper material includes a hydrophilic material to facilitate removal of water from the outer cover surface of the cover;
wherein the wiper and the outer cover surface are spaced apart from each other by a gap to minimize wear of the cover while cleaning the outer cover surface with the wiper;
wherein the second rail is directly connected to the wiper, the first rail is elongated along the first direction, the second rail is elongated along the first direction, the first rail is parallel to the second rail, the vehicle system further includes a first support directly connected to the cover, the vehicle system further includes a second support directly connected to the cover, each of the first support and the second support is a beam elongated along the second direction and configured to maintain the cover in a fixed position relative to the sensor, and the wiper is linearly movable relative to the cover at 0.5 meter per second, the sensor is a camera, and the first support is spaced apart from the second support along the first direction, the wiper includes a wiper body and a plurality of sharp protrusions extending from the wiper body; and
wherein the sensor assembly further includes a cleaner disposed adjacent to the cover to allow the wiper to directly contact the cleaner when the wiper moves linearly in the first direction relative to the outer cover surface of the cover, and the wiper is linearly movable toward and away from the cleaner in the first direction to remove water from the wiper when the wiper directly contacts the cleaner, and the cleaner is a brush.

\* \* \* \* \*